US008870697B2

(12) United States Patent
Sada et al.

(10) Patent No.: US 8,870,697 B2
(45) Date of Patent: Oct. 28, 2014

(54) POWER TRANSMISSION DEVICE

(75) Inventors: Natsuki Sada, Anjo (JP); Tomoo Atarashi, Kariya (JP); Hirotaka Yata, Kariya (JP); Tomoaki Nishizuru, Anjo (JP); Michitaka Tsuchida, Miyoshi (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 13/601,865

(22) Filed: Aug. 31, 2012

(65) Prior Publication Data
US 2013/0023372 A1 Jan. 24, 2013

Related U.S. Application Data

(63) Continuation-in-part of application No. PCT/JP2011/053872, filed on Feb. 10, 2011.

(30) Foreign Application Priority Data

Mar. 9, 2010 (JP) ................................. 2010-051859

(51) Int. Cl.
F16H 37/04 (2006.01)
F16H 3/44 (2006.01)
B60K 6/445 (2007.10)
B60K 6/40 (2007.10)
F16H 3/72 (2006.01)
F16H 57/08 (2006.01)
F16H 37/08 (2006.01)

(52) U.S. Cl.
CPC ............. *F16H 3/727* (2013.01); *Y02T 10/6239* (2013.01); *B60K 6/445* (2013.01); *F16H 57/082* (2013.01); *B60K 6/40* (2013.01); *F16H 2037/0866* (2013.01)
USPC ............... 475/149; 475/5; 475/343; 74/606 R

(58) Field of Classification Search
USPC ............ 475/5, 149–152, 329, 343; 74/606 R; 180/65.22, 65.235; 903/902, 952
See application file for complete search history.

(56) References Cited

U.S. PATENT DOCUMENTS 6,166,498 A 12/2000 Yamaguchi et al.
6,692,394 B2 2/2004 Takenaka
(Continued)

FOREIGN PATENT DOCUMENTS

DE 101 40 366 A1 7/2003
EP 1 220 423 A2 7/2002
(Continued)

OTHER PUBLICATIONS

Nov. 8, 2012 English Translation of Japanese Office Action issued in Japanese Patent Application No. 2010-051859.
(Continued)

*Primary Examiner* — Jacob S Scott
(74) *Attorney, Agent, or Firm* — Oliff PLC

(57) ABSTRACT

A hybrid drive system includes an input member, a rotating electric machine, a power distributing apparatus that distributes and transmits torque that is transmitted to the input member to the rotating electric machine and an output member, an output gear capable of outputting torque transmitted to the output member, and an output bearing that rotatably supports the output member from the radially inner side. The entire apparatus is arranged overlapping with the output member at a position in an axial direction on the radially inner side of the output member, and a ring gear of the apparatus is integrally provided with the output member, on an inner peripheral surface of the output member. The output gear is integrally provided with the output member, on an outer peripheral surface of the output member. The output bearing and the output gear are arranged overlapping at a position in the axial direction.

20 Claims, 5 Drawing Sheets

(56) References Cited

U.S. PATENT DOCUMENTS

| | | | |
|---|---|---|---|
| 7,001,296 B2* | 2/2006 | Yamauchi et al. | 475/5 |
| 8,645,037 B2 | 2/2014 | Kato et al. | |
| 2001/0050190 A1 | 12/2001 | Takenaka | |
| 2004/0121870 A1 | 6/2004 | Takenaka et al. | |
| 2007/0135255 A1 | 6/2007 | Kim et al. | |
| 2009/0014222 A1 | 1/2009 | Tatematsu et al. | |
| 2009/0023529 A1 | 1/2009 | Sanji et al. | |
| 2009/0065274 A1 | 3/2009 | Kano et al. | |
| 2009/0098969 A1 | 4/2009 | Tabata et al. | |
| 2009/0267352 A1 | 10/2009 | Sada et al. | |
| 2009/0295242 A1 | 12/2009 | Yamamoto et al. | |
| 2011/0039649 A1 | 2/2011 | Tanae et al. | |
| 2011/0113782 A1 | 5/2011 | Tsuchida et al. | |
| 2012/0143422 A1* | 6/2012 | Kitahata et al. | 475/5 |
| 2012/0329594 A1 | 12/2012 | Sada et al. | |
| 2013/0184111 A1 | 7/2013 | Tsuchida et al. | |

FOREIGN PATENT DOCUMENTS

| | | |
|---|---|---|
| JP | U-S58-091041 | 6/1983 |
| JP | A-2000-217205 | 8/2000 |
| JP | A-2001-355727 | 12/2001 |
| JP | A-2003-148595 | 5/2003 |
| JP | A-2003-191760 | 7/2003 |
| JP | A-2005-344917 | 12/2005 |
| JP | A-2006-29363 | 2/2006 |
| JP | A-2007-159287 | 6/2007 |
| JP | A-2009-108947 | 5/2009 |
| JP | A-2009-143348 | 7/2009 |
| JP | A-2009-166740 | 7/2009 |
| JP | A-2009-179205 | 8/2009 |
| JP | A-2009-257518 | 11/2009 |
| JP | A-2009-262858 | 11/2009 |
| JP | A-2009-286367 | 12/2009 |
| JP | A-2010-036820 | 2/2010 |
| WO | WO 2009/011240 A1 | 1/2009 |

OTHER PUBLICATIONS

Jun. 16, 2011 International Search Report issued in International Patent Application No. PCT/JP2011/053873.

U.S. Appl. No. 13/582,397, filed Sep. 21, 2012 in the name of Sada et al.

U.S. Appl. No. 13/601,759, filed Aug. 31, 2012 in the name of Sada et al.

U.S. Appl. No. 13/581,589, filed Aug. 28, 2012 in the name of Sada et al.

Written Opinion of the International Searching Authority issued in International Application No. PCT/JP2011/053873 dated Jun. 16, 2011.

Partial translation of Japanese Office Action issued in Japanese Patent Application No. 2010-051858 dated Nov. 8, 2012.

Written Opinion of the International Searching Authority issued in International Application No. PCT/JP2011/053872 dated Jun. 16, 2011.

Oct. 25, 2013 Office Action issued in U.S. Appl. No. 13/582,397.

Partial translation of Japanese Office Action issued in Japanese Patent Application No. 2010-051859 dated Nov. 8, 2012.

International Search Report issued in International Application No. PCT/JP2011/053872 dated Jun. 16, 2011.

May 22, 2014 Office Action issued in U.S. Appl. No. 13/581,589.

May 6, 2014 Notice of Allowance issued in U.S. Appl. No. 13/582,397.

Mar. 12, 2014 Office Action issued in U.S. Appl. No. 13/601,759.

* cited by examiner

POWER TRANSMISSION DEVICE

INCORPORATION BY REFERENCE

This is a Continuation-in-Part of International Application No. PCT/JP2011/053872 filed Feb. 10, 2011, which claims the benefit of Japanese Patent Application No. 2010-051859 filed Mar. 9, 2010. The disclosure of the prior applications is hereby incorporated by reference herein in its entirety.

BACKGROUND OF THE INVENTION

The present invention relates to power transmission devices including an input member, an output member, a planetary gear unit provided in a power transmission path connecting the input member to the output member, a case accommodating the output member and the planetary gear unit, and two output support bearings supporting the output member so that the output member is rotatable with respect to the case.

DESCRIPTION OF THE RELATED ART

For example, devices described in Japanese Patent Application Publication Nos. 2003-191760 (JP 2003-191760 A) and 2009-257518 (JP 2009-257518 A) are known as such power transmission devices. In the device described in Japanese Patent Application Publication No. 2003-191760 (JP 2003-191760 A), a planetary gear unit, two output support bearings, and an output gear (a counter drive gear) provided on the output member are arranged side-by-side at different positions in an axial direction. Thus, the power transmission device tends to be long in the axial direction.

In the device described in Japanese Patent Application Publication No. 2009-257518 (JP 2009-257518 A), an output member including an output gear (a counter drive gear) is rotatably supported from radially outside by two output support bearings. Since the two output support bearings are placed on the outer peripheral surface of the output member, bearings having a large diameter need be used as the output support bearings. Moreover, since the output gear and the two output support bearings are placed on the same outer peripheral surface of the output member, the degree of freedom in arrangement in the axial direction of the output gear is reduced.

SUMMARY OF THE INVENTION

Thus, power transmission devices are desired in which a planetary gear unit, two output support bearings, and an output gear are effectively arranged so that the axial length of the power transmission devices can be reduced and the degree of freedom in arrangement in the axial direction of the output gear can be increased.

According to a first aspect of the present invention, a power transmission device includes: an input member; an output member; a planetary gear unit provided in a power transmission path connecting the input member to the output member; a case accommodating the output member and the planetary gear unit; and two output support bearings supporting the output member so that the output member is rotatable with respect to the case, wherein an output gear is provided on an outer peripheral surface of the output member, and a ring gear of the planetary gear unit is provided on an inner peripheral surface of the output member, and the two output support bearings are placed on both sides in an axial direction of the ring gear, are placed between the inner peripheral surface of the output member and the case, and supports the output member from radially inside so that the output member is rotatable with respect to the case.

According to the first aspect, the two output support bearings and the ring gear of the planetary gear unit are provided on the inner peripheral surface of the output member, and the output gear is provided on the outer peripheral surface of the output member. Thus, the output gear can be more easily placed to overlap at least one of the planetary gear unit and the two output support bearings as viewed in a radial direction. Thus, a space in which the four elements, namely the two output support bearings, the planetary gear unit, and the output gear, are arranged in the axial direction can be more easily reduced as compared to the case where the output gear does not overlap the two output support bearings and the planetary gear unit as viewed in the radial direction. This facilitates reduction in axial length of the power transmission device.

According to the first aspect, since the two output support bearings are placed on both sides in the axial direction of the ring gear, the axial distance between the two output support bearings can be secured. This makes it easier to stably support the output member. For example, displacement of a central axis of rotation of the output member can be suppressed. A combined moment force of an axial load and a radial load from the output gear etc. is applied to the output member. The longer the axial distance between the two output support bearings is, the more the load that is applied to the two output support bearings due to the moment can be reduced. Since the axial distance between the two output support bearings is secured as described above, a load capacity required for the two output support bearings can be more easily reduced, whereby the two output support bearings can be more easily reduced in size.

The two output support bearings are placed on the inner peripheral surface of the output member. This facilitates reduction in diameter of the two output support bearings, and thus facilitates reduction in size of the output support bearings.

Moreover, since the two output support bearings and the ring gear of the planetary gear unit are placed on the inner peripheral surface of the output member, the output gear provided on the outer peripheral surface of the output member can be positioned to overlap the output support bearings and the planetary gear unit as viewed in the radial direction. Thus, the degree of freedom in arrangement in the axial direction of the output gear can be increased.

According to a second aspect of the present invention, the output gear may be placed as to overlap at least one of the planetary gear unit and the two output support bearings as viewed in the radial direction.

In this application, regarding arrangement of two members, the expression "overlap as viewed in a predetermined direction" as used herein means that when the predetermined direction is a viewing direction and a viewing point is shifted in each direction perpendicular to the viewing direction, the viewing point from which the two members are seen to overlap each other is present at least in a region.

According to the second aspect, the output gear provided on the outer peripheral surface of the output member is placed as to overlap at least one of the planetary gear unit and the two output support bearings which are provided on the inner peripheral surface of the output member, as viewed in the radial direction. Thus, the space in which the four elements, namely the two output support bearings, the planetary gear unit, and the output gear, are arranged in the axial direction can be more easily reduced as compared to the case where the output gear does not overlap the two output support bearings and the planetary gear unit as viewed in the radial direction. This facilitates reduction in axial length of the power transmission device.

According to a third aspect of the present invention, a root diameter of the output gear may be larger than both outer diameters of the two output support bearings and a root diameter of the ring gear.

According to the third aspect, the output gear provided on the outer peripheral surface of the output member can be more easily placed to overlap the output support bearings and the ring gear as viewed in the radial direction, whereby the degree of freedom in arrangement of the output gear can be further increased.

According to a fourth aspect of the present invention, the two output support bearings may be a first output support bearing placed on an axial first direction side, which is one side in the axial direction of the planetary gear unit, and a second output support bearing placed on an axial second direction side, which is the other side in the axial direction of the planetary gear unit, and the output gear may be placed between an end face on the axial first direction side of the first output support bearing and an end face on the axial second direction side of the second output support bearing in the axial direction.

According to the fourth aspect, the four elements, namely the two output support bearings, the planetary gear unit, and the output gear, can be placed in a region where the three elements, namely the two output support bearings and the planetary gear unit, are placed. This facilitates reduction in axial length of the power transmission device. Moreover, an application point of a load that is applied to the output gear can be located between two support points by the two output support bearings. This allows the load that is applied to the output gear to be appropriately distributed to and supported by the first output support bearing and the second output support bearing. This can reduce the size of each output support bearing, and thus facilitates reduction in size of the power transmission device.

According to a fifth aspect of the present invention, at least one of the output gear and the ring gear may be a helical gear, and the output gear may be placed on a side of an axial central position of the output member in the direction opposite a direction of an axial load that is applied to the output member due to the helical gear.

An axial load and a radial load are applied to the output member due to the helical gear of at least one of the output gear and the ring gear. According to the fifth aspect, the output gear is placed on the side of the axial central position in the direction opposite the direction of the axial load. Thus, one of the two output support bearings, which is subjected to a larger axial load, is subjected to a smaller radial load as compared to the other output support bearing. Accordingly, support of both the axial load and the radial load can be appropriately assigned between the two output support bearings. An appropriate bearing can thus be used as each output support bearing according to the type and magnitude of the load to be supported by that output support bearing, whereby the strength of the output support bearing can be improved or the size of the output support bearing can be reduced. Moreover, the load of the same magnitude can be applied to the two output support bearings, and the two output support bearings can be reduced in size in a balanced manner.

According to a sixth aspect of the present invention, the case may have two radially extending portions and two output protruding portions, the two radially extending portions may extend in the radial direction on both sides in the axial direction of the output member, and may be formed so that at least radially inner ends of the two radially extending portions are located radially inward of the output member, the two output protruding portions may be located radially inward of the output member so as to protrude in the axial direction from the two radially extending portions toward the output member, respectively, and the two output support bearings may be placed between the inner peripheral surface of the output member and outer peripheral surfaces of the output protruding portions, respectively, and may support the output member from radially inside so that the output member is rotatable with respect to the output protruding portions.

According to the sixth aspect, the output member can be appropriately supported from radially inside by the two output support bearings.

According to a seventh aspect of the present invention, the power transmission device may further includes: a rotating electrical machine placed coaxially with the planetary gear unit; and a rotating electrical machine bearing that supports a rotating shaft of the rotating electrical machine so that the rotating shaft is rotatable with respect to the case, wherein the case may have the radially extending portion that supports the output support bearing placed on a side where the rotating electrical machine is provided with respect to the ring gear in the axial direction, the planetary gear unit may include, in addition to the ring gear, a rotating element that is drivingly coupled to the input member not through the other rotating elements of the planetary gear unit, and a rotating element that is drivingly coupled to the rotating electrical machine not through the other rotating elements of the planetary gear unit, the rotating electrical machine bearing may be supported by a radially inner end of the radially extending portion placed on the side where the rotating electrical machine is provided, and may support the rotating shaft of the rotating electrical machine from radially outside so that the rotating shaft of the rotating electrical machine is rotatable with respect to the radially extending portion.

In this application, the expression "drivingly coupled" refers to the state in which two rotating elements are coupled together so as to be able to transmit a driving force between the two rotating elements, and is used as a concept including the state in which the two rotating elements are coupled together so as to rotate together, or the state in which the two rotating elements are coupled together so as to be able to transmit a driving force between the two rotating elements via one or more transmission members. Such transmission members include various members that transmit rotation at the same speed or at a shifted speed, and for example, include a shaft, a gear mechanism, a belt, a chain, etc.

Such transmission members may include an engagement device that selectively transmits rotation and a driving force, such as a friction engagement device, a dog engagement device, etc.

In this application, the "rotating electrical machine" is used as a concept including a motor (an electric motor), a generator (an electric generator), and a motor-generator that functions both as the motor and the generator as necessary.

According to the seventh aspect, not only the output member but also the rotating shaft of the rotating electrical machine can be supported by the radially extending portion located on the side where the rotating electrical machine is provided. Thus, the output member and the rotating shaft can be supported by the common support member, thereby further facilitating reduction in size of the power transmission device.

The rotating electrical machine bearing supports the rotating shaft of the rotating electrical machine from radially outside. Thus, the rotating shaft of the rotating electrical machine can be made to extend radially inward of the rotating electrical machine bearing and to extend in the axial direction so as to be drivingly coupled to the rotating elements of the planetary gear unit.

According to an eighth aspect of the present invention, the power transmission device may further include: a fixing gear with which a fixing member is engaged, wherein the fixing member may hold the output member stationary with respect to the case, and the fixing gear may be provided at a different axial position from the outer gear on the outer peripheral surface of the output member.

According to the eighth aspect, the fixing gear can be provided by effectively using a part of the outer peripheral surface of the output member on which the output gear is not placed. Accordingly, an increase in axial length of the pore transmission device can be suppressed even in the configuration including the fixing gear.

DETAILED DESCRIPTION OF THE EMBODIMENTS

An embodiment of a power transmission device 11 according to the present invention will be described below with reference to the accompanying drawings.

Figure 1:
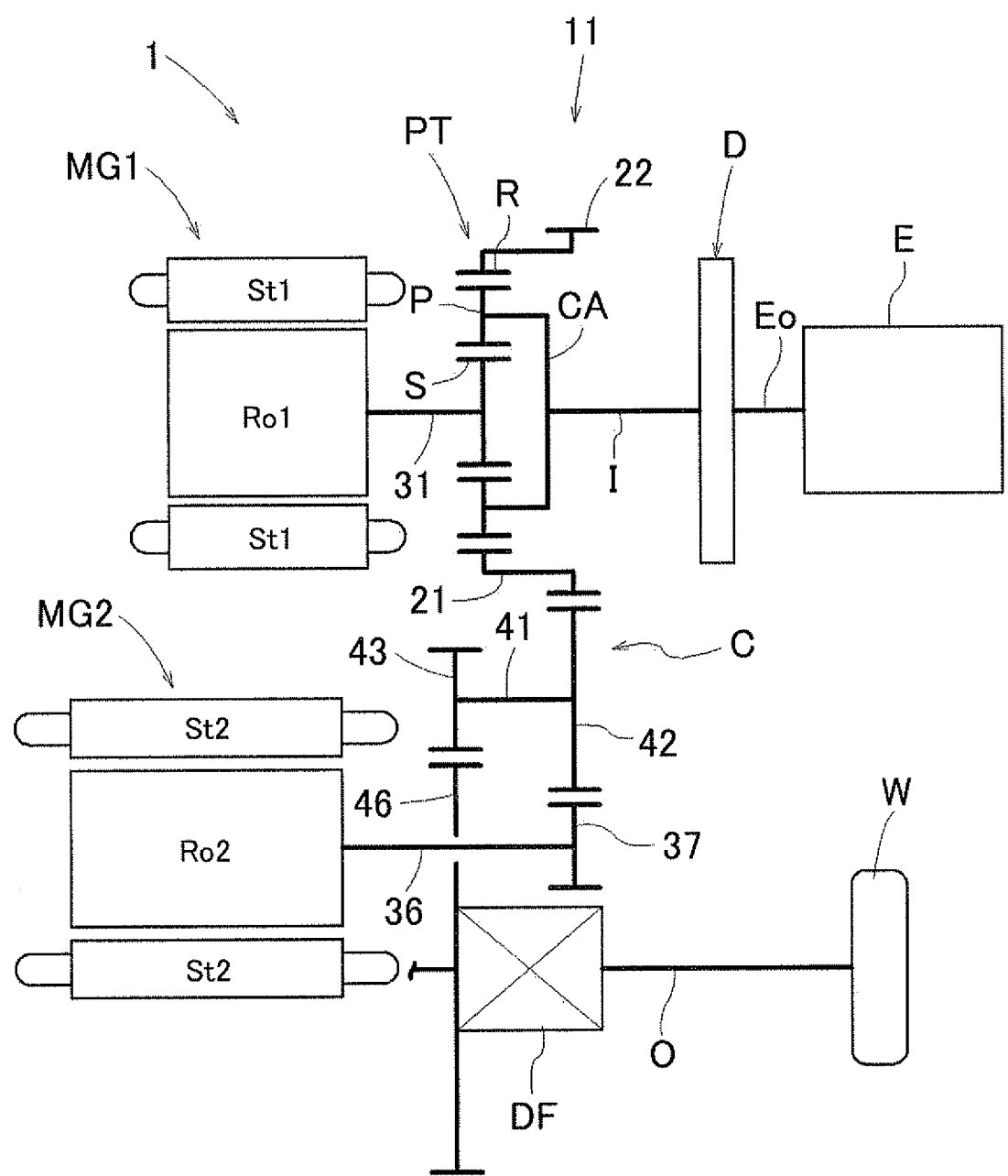
FIG. 1 is a skeleton diagram of a hybrid drive device according to an embodiment of the present invention.
Figure 3:
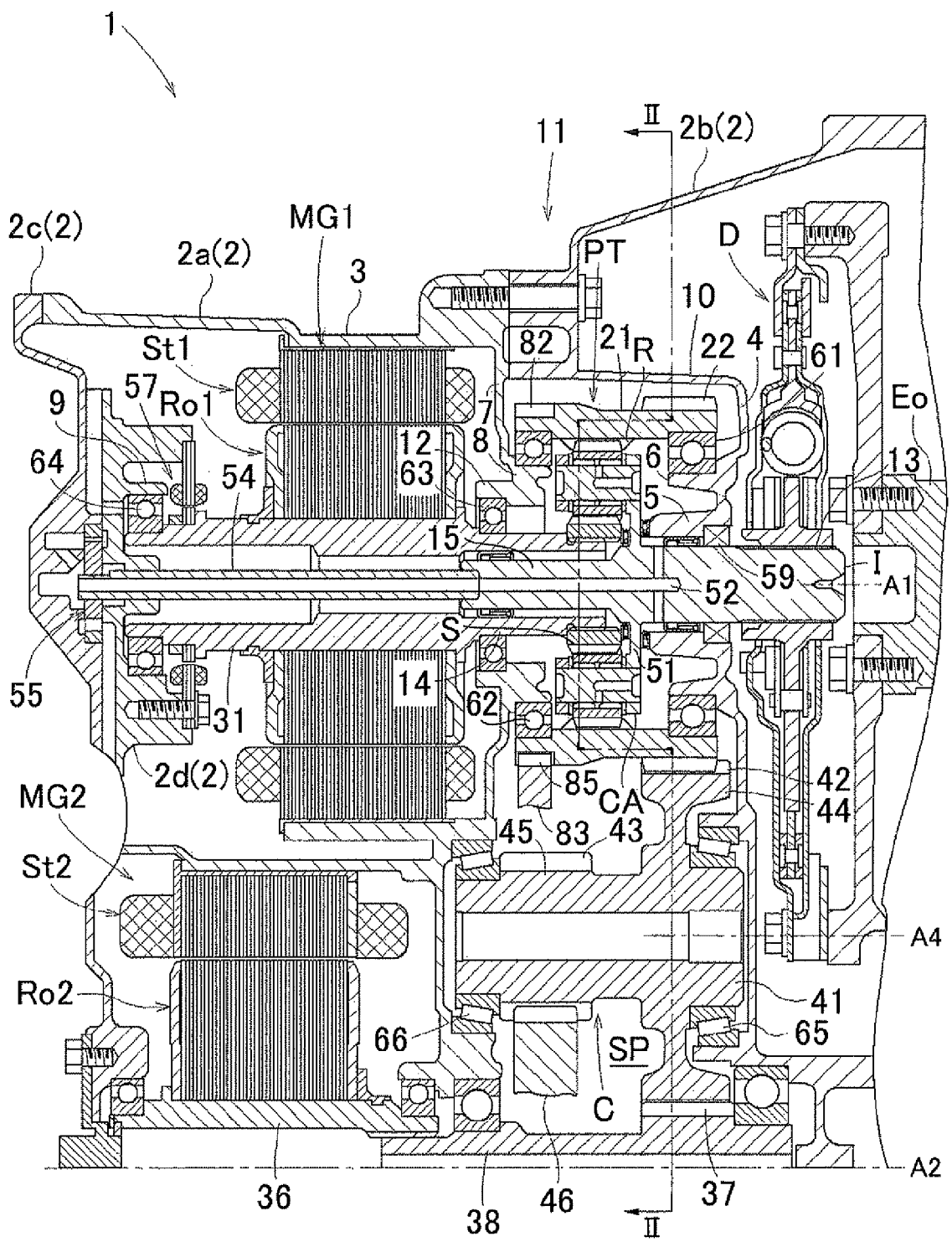
FIG. 3 is an axially developed sectional view of the hybrid drive device according to the embodiment of the present invention.
Figure 4:
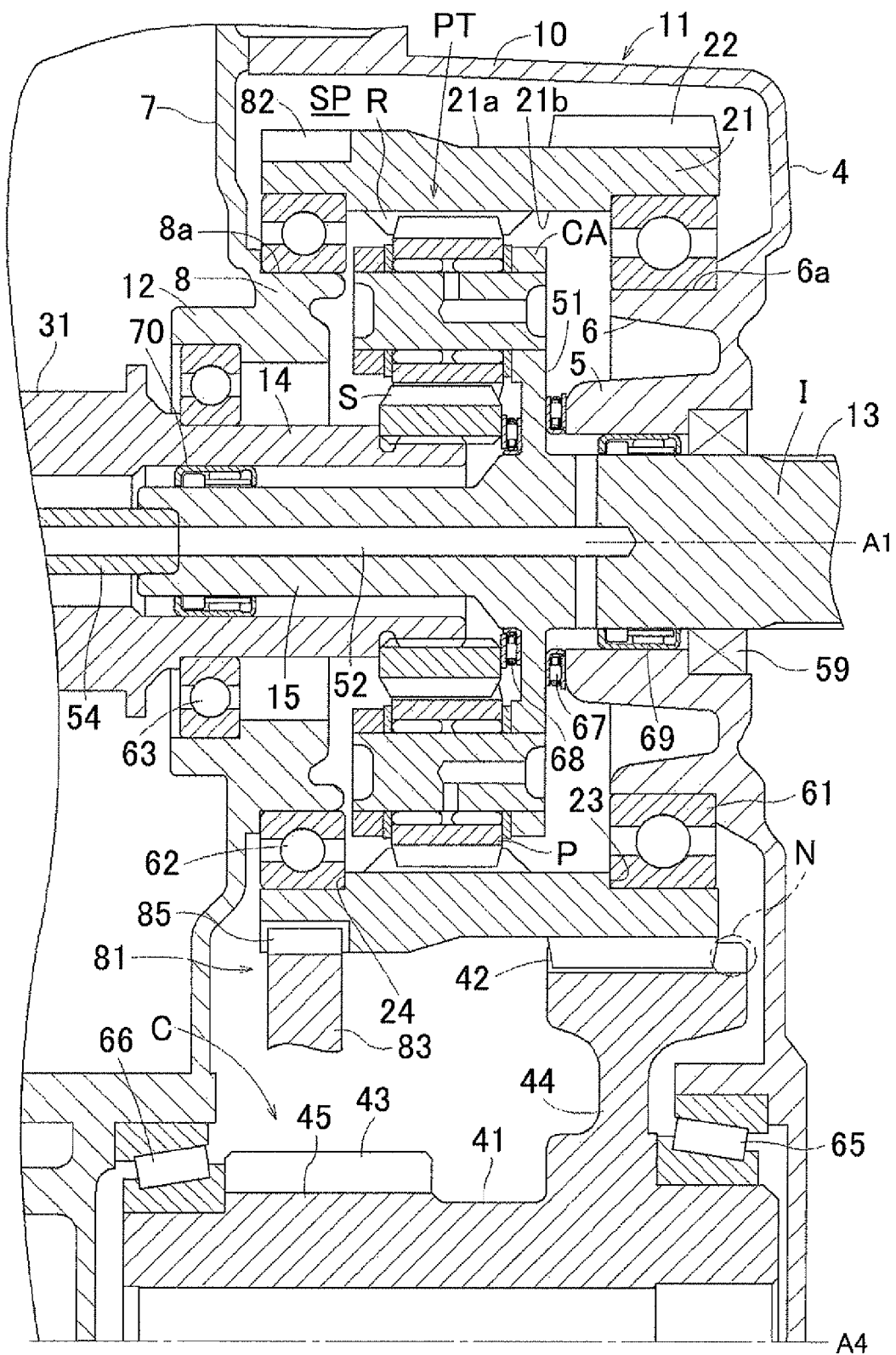
FIG. 4 is a sectional view of a main part of the hybrid drive device according to the embodiment of the present invention.

As shown in FIGS. 1, 3, and 4, the power transmission device 11 includes an input shaft I, a distribution output member 21, a power distribution device PT provided in a power transmission path connecting the input shaft I to the distribution output member 21, a case 2 accommodating the distribution output member 21 and the power distribution device PT, and two output support bearings 61, 62 supporting the distribution output member 21 so that the distribution output member 21 is rotatable with respect to the case 2. In the present embodiment, the power distribution device PT is formed by a planetary gear unit. The input shaft I corresponds to the "input member" in the present invention, and the distribution output member 21 corresponds to the "output member" in the present invention.

The input shaft I, the distribution output member 21, and the power distribution device PT are coaxially arranged on a first axis A1, and are supported so as to be rotatable about the first axis A1. In the following description, the "axial direction," the "radial direction," and the "circumferential direction" refer to the axial direction, the radial direction, and the circumferential direction for the first axis A1 unless otherwise specified. In the present embodiment, since a second axis A2, a third axis A3, and a fourth axis A4 are arranged parallel to the first axis A1, the "axial direction" refers to the axial direction common to these axes. The direction from the power distribution device PT toward an engine E (toward the right side in FIGS. 1, 3, and 4) in the axial direction is herein defined as the "axial first direction," and the opposite direction thereto, namely the direction from the power distribution device PT toward a first rotating electrical machine MG1 (toward the left side in FIGS. 1, 3, and 4) is herein defined as the "axial second direction."

As shown in FIG. 4, an output gear 22 is provided on an outer peripheral surface 21a of the distribution output member 21, and a ring gear R of the power distribution device PT is provided on an inner peripheral surface 21b of the distribution output member 21.

The two output support bearings 61, 62 are placed on both sides in the axial direction of the ring gear R.

Each of the two output support bearings 61, 62 is placed between the inner peripheral surface 21b of the distribution output member 21 and the case 2, and supports the distribution output member 21 from radially inside so that the distribution output member 21 is rotatable with respect to the case 2.

A first radially extending wall 4 and a second radially extending wall 7, which will be described below, correspond to the "two radially extending portions" in the present invention.

In the present embodiment, the power transmission device 11 forms a part of a hybrid drive device 1. The hybrid drive device 1 is a drive device for hybrid vehicles that are capable of running by using both the engine E and rotating electrical machines MG1, MG2 as driving force sources. The hybrid drive device 1 according to the present embodiment is a hybrid drive device that is placed adjacent to the engine E, mounted transversely in the vehicle, in the lateral direction of the vehicle, and that is coupled to the engine E in the axial direction of an output shaft Eo of the engine E. For example, the hybrid drive device 1 according to the present embodiment is a hybrid drive device having a configuration suitable for front engine front drive (FF) vehicles.

The hybrid drive device 1 is configured as a so-called 2-motor split type hybrid drive device. In the hybrid drive device 1, the power distribution device PT is configured to distribute and transfer the torque of the engine E, which is transferred to the power distribution device PT via the input shaft I, to the first rotating electrical machine MG1 and the distribution output member 21. The second rotating electrical machine MG2 is also drivingly coupled via a counter gear mechanism C to the output gear 22 provided on the distribution output member 21.

1. Overall Configuration of Hybrid Drive Device

First, the overall configuration of the hybrid drive device 1 according to the present embodiment will be described. As shown in FIGS. 1 and 3, the input shaft I is drivingly coupled to the engine E. The engine E is an internal combustion engine that is driven by fuel combustion. For example, various known engines such as a gasoline engine and a diesel engine can be used as the engine E. In this example, the input shaft I is drivingly coupled to the engine output shaft Eo such as a crankshaft of the engine E via a damper D. It is also preferable that the input shaft I be drivingly coupled to the engine output shaft Eo via a clutch etc. in addition to the damper D, or be directly drivingly coupled to the engine output shaft Ea with none of the damper D, the clutch, etc. interposed therebetween.

The first rotating electrical machine MG1 has a first stator St1 fixed to the case 2, and a first rotor Ro1 rotatably supported radially inward of the first stator St1. The first rotor Ro1 is drivingly coupled to a sun gear S of the power distribution device PT so as to rotate together therewith. The first rotating electrical machine MG1 is capable of functioning as a motor (an electric motor) that is supplied with electric power to generate power, and as a generator (an electric generator) that is supplied with power to generate electric power. Thus, the first rotating electrical machine MG1 is electrically connected to an electricity storage device, not shown. In this example, a battery is used as the electricity storage device. It is also preferable to use a capacitor etc. as the electricity storage device. In this example, the first rotating electrical machine MG1 mainly functions as a generator that generates electric power by using the torque of the input shaft I (the engine E) received via the power distribution device PT, and thus charges the battery or supplies the electric power for driving the second rotating electrical machine MG2. However, during high-speed running of the vehicle, starting of the engine E, etc., the first rotating electrical machine MG1 may function as a motor that performs power running to output a driving force.

The second rotating electrical machine MG2 has a second stator St2 fixed to the case 2, and a second rotor Ro2 rotatably supported radially inward of the second stator St2. The second rotor Ro2 is drivingly coupled to a second rotating electrical machine output gear 37 so as to rotate together therewith. The second rotating electrical machine MG2 is capable of functioning as a motor (an electric motor) that is supplied with electric power to generate power, and as a generator (an electric generator) that is supplied with power to generate electric power. Thus, the second rotating electrical machine MG2 is also electrically connected to the battery as the electricity storage device. In this example, the second rotating electrical machine MG2 mainly functions as a motor that assists in providing a driving force for causing the vehicle to run. However, during deceleration of the vehicle etc., the second rotating electrical machine MG2 can function as a generator that regenerates an inertial force of the vehicle as electrical energy.

In the present embodiment, the power distribution device PT is a single-pinion type planetary gear mechanism placed coaxially with the input shaft I. That is, the power distribution device PT has three rotating elements, namely a carrier CA, the sun gear S, and the ring gear R. The carrier CA supports a plurality of pinion gears P, and the sun gear S and the ring gear R mesh with the pinion gears P. The sun gear S is drivingly coupled to a first rotor shaft 31 of the first rotor Ro1 of the first rotating electrical machine MG1 so as to rotate together therewith. The carrier CA is drivingly coupled to the input shaft I so as to rotate together therewith. The ring gear R is formed integrally with the distribution output member 21. These three rotating elements of the power distribution device PT are the sun gear S (the first rotating element), the carrier CA (the second rotating element), and the ring gear R (the third rotating element) in the order of the rotational speed. Note that the "order of the rotational speed" means the descending order (from high speed to low speed) or the ascending order (from low speed to high speed) of the rotational speed, and can be either one depending on the rotating state of the planetary gear mechanism as the power distribution device PT. However, in either case, the order of the rotating elements does not change.

The power distribution device PT distributes and transfers the torque of the engine E, which is transferred to the input shaft I, to the first rotating electrical machine MG1 and the distribution output member 21. In the power distribution device PT, the input shaft I is drivingly coupled to the carrier CA, which is an intermediate rotating element in the order of the rotational speed. The first rotor Ro1 of the first rotating electrical machine MG1 is drivingly coupled to the sun gear CA, which is a rotating element on one side in the order of the rotational speed. The ring gear R, which is a rotating element on the other side in the order of the rotational speed, is formed integrally with the distribution output member 21. In the hybrid drive device 1 according to the present embodiment, the torque in a positive direction from the engine E is transferred via the input shaft I to the carrier CA, which is the intermediate rotating element in the order of the rotational speed, and the torque in a negative direction, which is output from the first rotating electrical machine MG1, is transferred via the first rotor shaft 31 to the sun gear S, which is the rotating element on the one side in the order of the rotational speed. The torque in the negative direction from the first rotating electrical machine MG1 functions to receive a reaction force of the torque of the engine E. Thus, the power distribution device PT distributes to the first rotating electrical machine MG1 a part of the torque of the engine E transferred via the input shaft I to the carrier CA, and transfers via the ring gear R to the distribution output member 21 the toque attenuated with respect to the torque of the engine E.

In the present embodiment, the distribution output member 21 is a substantially cylindrical member provided so as to surround the radially outer side of the power distribution device PT. The ring gear R of the power distribution device PT is formed integrally with the distribution output member 21 on the inner peripheral surface 21b of the distribution output member 21. The output gear 22 is formed integrally with the distribution output member 21 on the outer peripheral surface 21a of the distribution output member 21. That is, in the present embodiment, the ring gear R of the power distribution device PT and the output gear 22 are formed integrally with the inner and outer peripheral surfaces of the distribution output member 21, respectively. Thus, the torque transferred to the distribution output member 21 via the ring gear R of the power distribution device PT can be output toward wheels W via the output gear 22.

The hybrid drive device 1 according to the present embodiment further includes the counter gear mechanism C. The counter gear mechanism C reverses the rotational direction of the output gear 22, and further transfers the output torque from the output gear 22 toward the wheels W. The counter gear mechanism C has a counter shaft 41, a first gear 42, and a second gear 43. The first gear 42 meshes with the output gear 22. The first gear 42 also meshes with the second rotating electrical machine output gear 37 at a different position in the circumferential direction from the output gear 22. The second gear 43 meshes with a differential input gear 46 of an output differential gear unit DF described below. Thus, the counter gear mechanism C reverses the rotational direction of the output gear 22 and the second rotating electrical machine output gear 37, and transfers the torque that is transferred to the output gear 22 and the torque of the second rotating electrical machine MG2 to the output differential gear unit DF.

The hybrid drive device 1 according to the present embodiment further includes the output differential gear unit DF. The output differential gear unit DF has the differential input gear 46, and distributes and transfers the torque, which is transferred to the differential input gear 46, to the plurality of wheels W. In this example, the output differential gear unit DF is a differential gear mechanism using a plurality of bevel gears meshing each other, and distributes and transfers the torque, which is transferred to the differential input gear 46 via the second gear 43 of the counter gear mechanism C, to the two wheels W, namely the right and left wheels W, via an axle O. At this time, the output differential gear unit DF reverses the rotational direction of the second gear 43 to transfer the torque to the wheels W. Thus, during forward running of the vehicle, the hybrid drive device 1 rotates the wheels W in the same direction as the rotational direction of the input shaft I (the engine E), and transfers the torque in the same direction as that of the input shaft I (the engine E) and the second rotating electrical machine MG2 to the wheels W, thereby causing the vehicle to run.

Figure 2:
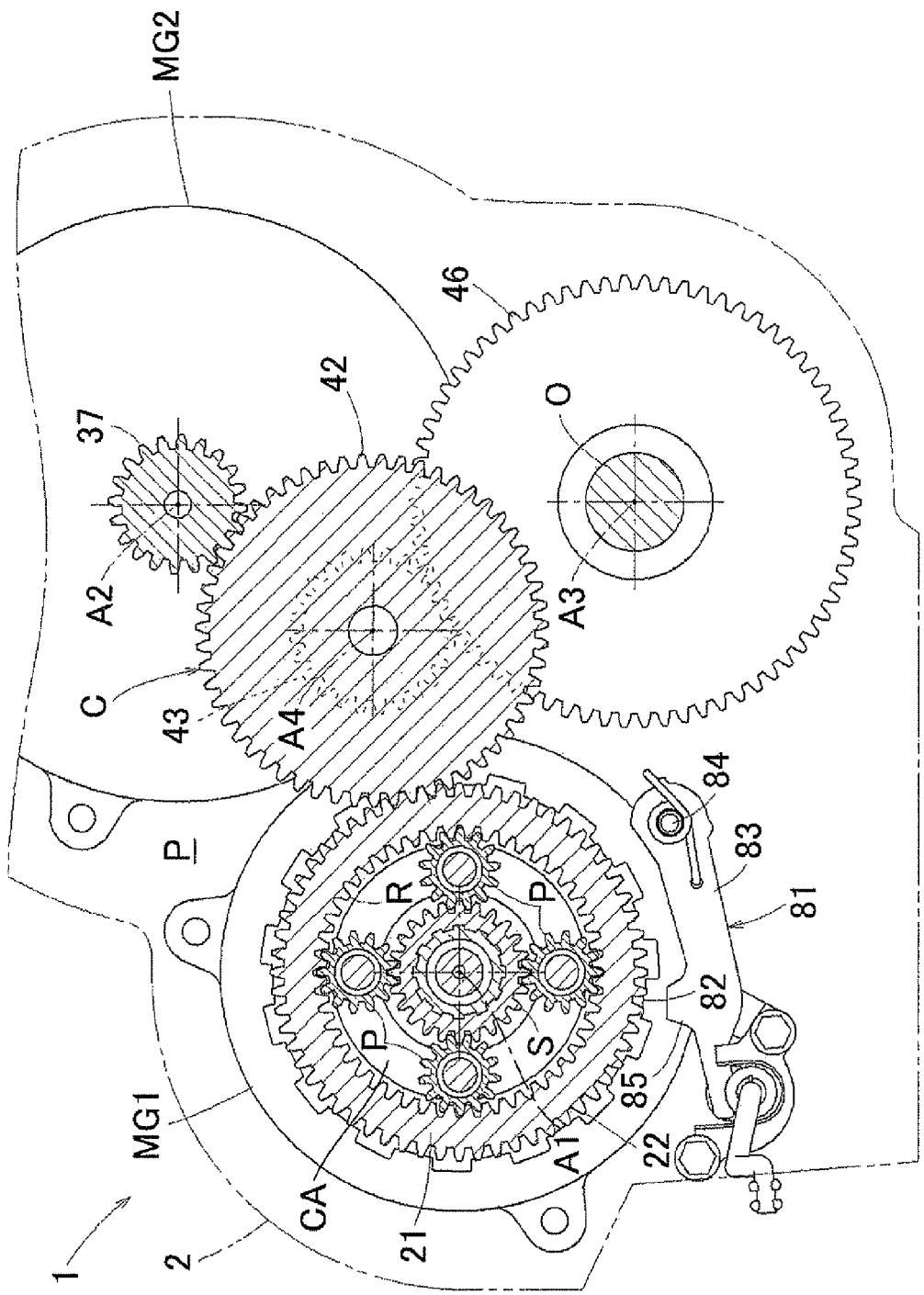
FIG. 2 is a cross-sectional view of the hybrid drive device according to the embodiment of the present invention along a plane perpendicular to the axial direction.

As shown in FIG. 2, the hybrid drive device 1 according to the present embodiment has a four-axis configuration having four separate axes, namely the first axis A1 on which the input shaft I, the power distribution device PT, and the first rotating electrical machine MG1 are placed, the second axis A2 on which the second rotating electrical machine MG2 is placed, the third axis A3 on which the output differential gear unit DF is placed, and the fourth axis A4 on which the counter gear mechanism C is placed. The first axis A1, the second axis A2, the third axis A3, and the fourth axis A4 are placed parallel to each other. In the illustrated example, the first axis A1, the second axis A2, and the third axis A3 are placed so that lines connecting these axes form a triangle as viewed in the axial direction, and the fourth axis A4 is placed so as to be located inside the triangle as viewed in the axial direction.

2. Mechanical Configuration of Each Part of Hybrid Drive Device

Next, the mechanical configuration of each part of the hybrid drive device 1 according to the present embodiment will be described. In particular, the mechanical configuration of each component of the power transmission device 11 will be described in detail. The input member I, the first rotating electrical machine MG1, the second rotating electrical machine MG2, the power distribution device PT, the distribution output member 21, the output gear 22, the counter gear mechanism C, and the output differential gear unit DF are accommodated in the case 2. In the present embodiment, as shown in FIG. 3, the case 2 is configured to be dividable into a case main body 2a, a front cover 2b that is attached to an axial first direction side (one side in the axial direction) of the case main body 2a, and a rear cover 2c that is attached to an axial second direction side (the other side in the axial direction) of the case main body 2a. The case main body 2a, the front cover 2a, and the rear cover 2c are fastened and fixed together by using a fastening member such as a bolt.

The first rotating electrical machine MG1 and the second rotating electrical machine MG2 are mainly accommodated in the case main body 2a. The input member I, the power distribution device PT, the distribution output member 21, the output gear 22, the counter gear mechanism C, and the output differential gear unit DF are mainly accommodated in an accommodating space SP formed between the case main body 2a and the front cover 2b. The case main body 2a includes a case peripheral wall 3 formed in an irregular cylindrical shape so as to cover the outer peripheries of at least the first rotating electrical machine MG1 and the second rotating electrical machine MG2, and the second radially extending wall 7 that closes an opening at an end on the axial first direction side of the case peripheral wall 3. The case peripheral wall 3 and the second radially extending wall 7 are formed integrally. The front cover 2b includes a partition wall 10 and the first radially extending wall 4. The partition wall 10 is formed in an irregular cylindrical shape so as to cover the outer peripheries of at least the power distribution device PT, the distribution output member 21, the output gear 22, the counter gear mechanism C, and the output differential gear unit DF. The first radially extending wall 4 closes an opening at an end on the axial first direction side of the partition wall 10. The partition wall 10 and the first radially extending wall 4 are formed integrally. The rear cover 2c is formed as a substantially flat plate-like member having a shape corresponding to the outer shape of the case peripheral wall 3 so as to close an opening at an end on the axial second direction side of the case peripheral wall 3 of the case main body 2a.

The first radially extending wall 4 is formed to extend at least in the radial direction between the power distribution device PT and the distribution output member 21 and the engine E in the axial direction. The first radially extending wall 4 is formed so as to extend in the radial direction on the axial first direction side with respect to the distribution output member 21, and to have at least its radially inner end located radially inward of the distribution output member 21. In the present embodiment, the first radially extending wall 4 extends in the radial direction from a position radially outward of the distribution output member 21 to a position radially inward of the distribution output member 21 on the axial first direction side with respect to the distribution output member 21. The first radially extending wall 4 extends in the radial and circumferential directions. The first radially extending wall 4 supports both a first input support bearing 69 and the first output support bearing 61. The first input support bearing 69 rotatably supports the input shaft I from radially outside, and the first output support bearing 61 rotatably supports the distribution output member 21 from radially inside.

The first radially extending portion 4 includes a first output protruding portion 6 that is located radially inward of the distribution output member 21 so as to protrude in the axial direction (the axial second direction) from the first radially extending wall 4 toward the distribution output member 21. The first output support bearing 61 is provided on an outer peripheral surface 6a of the first output protruding portion 6. In the present embodiment, the first output protruding portion 6 and the first output support bearing 61 are formed in a cylindrical shape.

A through hole in the axial direction is formed radially inward (in a central portion) of the first radially extending wall 4. The input member I, which is inserted through this through hole, extends through the first radially extending wall 4 and is inserted in the case 2. The first radially extending wall 4 includes a first input protruding portion 5 that protrudes in the axial direction from the radially inner end of the first radially extending wall 4. The first input support bearing 69 is provided on an inner peripheral surface of the first input protruding portion 5. In the present embodiment, the first input protruding portion 5 is formed so as to protrude in the axial direction (the axial second direction) from the first radially extending wall 4 toward the distribution output member 21. The first input protruding portion 5 is placed radially inward of the first output protruding portion 6 so as to overlap the first output protruding portion 6 as viewed in the radial direction. The first input protruding portion 5 and the first input support bearing 69 are formed in a cylindrical shape. The first input protruding portion 5 and the first output protruding portion 6 are formed so as to protrude in the axial second direction from the first radially extending wall 4 to a position where the first input protruding portion 5 and the first output protruding portion 6 overlap the distribution output member 21 as viewed in the radial direction.

The second radially extending wall 7 is formed to extend at least in the radial direction between the power distribution device PT and the distribution output member 21 and the first rotating electrical machine MG1 in the axial direction. The second radially extending wall 7 is formed so as to extend in the radial direction on the axial second direction side with respect to the distribution output member 21, and to have at least its radially inner end located radially inward of the distribution output member 21. In the present embodiment, the second radially extending wall 7 extends in the radial direction from a position radially outward of the distribution output member 21 to a position radially inward of the distribution output member 21 on the axial second direction side with respect to the distribution output member 21. The second radially extending wall 7 extends in the radial and circumferential directions. The second radially extending wall 7 supports both a first rotating electrical machine bearing 63 and the second output support bearing 62. The first rotating electrical machine bearing 63 rotatably supports the first rotor shaft 31 of the first rotating electrical machine MG1 from radially outside, and the second output support bearing 62 rotatably supports the distribution output member 21 from radially inside.

The second radially extending portion 7 includes a second output protruding portion 8 that is located radially inward of the distribution output member 21 so as to protrude in the axial direction (the axial first direction) from the second radially extending wall 7 toward the distribution output member 21. The second output support bearing 62 is provided on an outer peripheral surface 8a of the second output protruding portion 8. In the present embodiment, the second output protruding portion 8 and the second output support bearing 62 are formed in a cylindrical shape.

A through hole in the axial direction is formed radially inward (in a central portion) of the second radially extending wall 7. The first rotor shaft 31 of the first rotating electrical machine MG1, which is inserted through this through hole, extends through the second radially extending wall 7, and is coupled to the sun gear S as the rotating element of the power distribution device PT in the accommodating space SP. The second radially extending wall 7 includes a second input protruding portion 12 that protrudes in the axial direction from the radially inner end of the second radially extending wall 7. The first rotating electrical machine bearing 63 is provided on an inner peripheral surface of the second input protruding portion 12. In the present embodiment, the second input protruding portion 12 is formed so as to protrude in the axial direction (the axial second direction) from the second radially extending wall 7 toward the first rotating electrical machine MG1. The second input protruding portion 12 and the first rotating electrical machine bearing 63 are formed in a cylindrical shape. The second output protruding portion 8 is formed so as to protrude in the axial first direction from the second radially extending wall 7 to a position where the second output protruding portion 8 overlaps the distribution output member 21 as viewed in the radial direction.

As shown in FIG. 3, a pump cover 2d is attached to an end face of the rear cover 2c, which is located on the axial first direction side, namely the inner side of the case 2. The pump cover 2d is fastened and fixed to the rear cover 2c by a fastening member such as a bolt so as to contact the axial first direction side of the rear cover 2c. A pump chamber is formed between the rear cover 2c and the pump cover 2d, and an oil pump 55 is placed in the pump chamber. In the present embodiment, an internal gear pump having an inner rotor and an outer rotor is used as the oil pump 55. In the present embodiment, the inner rotor of the oil pump 55 is driven by a tubular pump drive shaft 54 that is coupled to the input shaft I so as to rotate together therewith. Oil that is discharged from the oil pump 55 is supplied to the power distribution device PT, the plurality of gears, the plurality of bearings, etc. through an internal oil passage 52 formed in inner diameter portions of the pump drive shaft 54 and the input shaft I, thereby lubricating and cooling these elements. The pump cover 2d includes a cylindrical (boss-shaped) axially protruding portion 9 that protrudes toward the axial first direction side (the side of the first rotating electrical machine MG1, namely the inner side of the case 2). The axially protruding portion 9 is formed integrally with the pump cover 2d.

The input shaft I is a shaft that applies the torque of the engine E to the inside of the hybrid drive device 1. As shown in FIGS. 3 and 4, the input shaft I is coupled to the engine E in the engine coupling portion 13 provided in the vicinity of the end on the axial first direction side of the input shaft I. The input shaft I is provided to extend through the case 2, and is coupled to the engine output shaft Eo of the engine E via the damper D on the axial first direction side of the first radially extending wall 4 so as to rotate together with the engine output shaft Eo. Spline grooves are provided in an outer peripheral surface of the engine coupling portion 13, so that the engine coupling portion 13 is spline coupled to the damper D. The damper D is a device that transmits rotation of the engine output shaft Eo to the input shaft I while attenuating torsional vibration of the engine output shaft Eo, and various known devices can be used as the damper D. In the present embodiment, the damper D is shaped so as to be symmetrical with respect to the axial direction, and is shaped so that the width of the damper D in the axial direction decreases as the distance from the input shaft I in the radial direction increases. The input shaft I is supported by the first input protruding portion 5 of the first radially extending portion 4 so as to be rotatable via the first input support bearing 69. An oil seal 59 that suppresses oil leakage to the axial first direction side (the side where the damper D and the engine E are provided) is placed between the first radially extending wall 4 and the input shaft I.

The input shaft I includes a distribution coupling portion 51 that is coupled to the power distribution device PT. The distribution coupling portion 51 is formed in a flange shape extending radially outward from a shaft body of the input shaft I on the axial first direction side of the power distribution device PT. In this example, the distribution coupling portion 51 forms the carrier CA of the power distribution device PT. The distribution coupling portion 51 is formed integrally with the input shaft I. The distribution coupling portion 51 extends between the sun gear S and the first input protruding portion 5 of the first radially extending wall 4, and is coupled to the carrier CA as the rotating element of the power distribution device PT. The first input protruding portion 5 of the first radially extending wall 4 and the sun gear S contact both sides in the axial direction of the distribution coupling portion 51 via a first thrust bearing 67 and a second thrust bearing 68, respectively. That is, the first thrust bearing 67 is provided between an end face on the axial first direction side of the distribution coupling portion 51 and an end face on the axial second direction side of the first input protruding portion 5 so as to contact these end faces. The second thrust bearing 68 is provided between an end face on the axial second direction side of the distribution coupling portion 51 and an end face on the axial first direction side of the sun gear S so as to contact these end faces.

The input shaft I includes an extending portion 15 that extends from the distribution coupling portion 1 to the side where the first rotating electrical machine MG1 is provided (the axial second direction side) along the axial direction. The extending portion 15 has a smaller diameter than a region located between the distribution coupling portion 51 and the engine coupling portion 13 in the input shaft I. The first rotor shaft 31 of the first rotating electrical machine MG1 includes an axial cylindrical portion 14 that opens at an end on the axial first direction side (the side where the power distribution device PT is provided), and the extending portion 15 of the input shaft I is inserted in the axial cylindrical portion 14. The extending portion 15 is supported in the radial direction so as to be rotatable with respect to an inner peripheral surface of the axial cylindrical portion 14 via a second input support bearing 70.

The first rotor shaft 31 is a shaft that applies the torque of the first rotating electrical machine MG1 to the sun gear S as the rotating element of the power distribution device PT (or applies the torque, which is transferred to the sun gear S, to the first rotating electrical machine MG1). As shown in FIGS. 3 and 4, the first rotor shaft 31 is spline coupled to the sun gear S at an end of the first rotor shaft 31 on the axial first direction side. The first rotor shaft 31 is supported by the second input protruding portion 12, which forms the radially inner end of the second radially extending wall 7, so as to be rotatable via the first rotating electrical machine bearing 63. In other words, the first rotating electrical machine bearing 63 is supported by the radially inner end of the second radially extending wall 7, and supports the first rotor shaft 31 from radially outside so that the first rotor shaft 31 is rotatable with respect to the second radially extending wall 7. The first rotor shaft 31 is rotatably supported by the axially protruding portion 9 of the pump cover 2*d* via a second rotating electrical machine bearing 64 at a different position in the axial direction from the first rotating electrical machine bearing 63 (in this example, at an end of the first rotor shaft 31 on the axial second direction side). In the present embodiment, a rotation sensor 57 that detects the rotational phase of the first rotor Ro1 of the first rotating electrical machine MG1 is provided so as to surround the first rotor shaft 31. The rotation sensor 57 is placed on the axial first direction side with respect to the pump cover 2*d* and the second rotating electrical machine 64 in the axial direction so as to be adjacent to the pump cover 2*d* and the second rotating electrical machine 64. A resolver etc. can be used as the rotation sensor 57.

At least a part of the distribution output member 21 in the axial direction is a cylindrical portion. The output gear 22, which drivingly couples the distribution output member 21 to the wheels W, is provided on the outer peripheral surface 21*a* of the distribution output member 21. The ring gear R of the power distribution device PT is provided on the inner peripheral surface 21*b* of the distribution output member 21. In the present embodiment, the distribution output member 21 is formed in a cylindrical shape along the entire axial length. The distribution output member 21 of this example is formed so that at least a part of the entire axial length of the distribution output member 21 from the end on the axial first direction side to the end on the axial second direction side has the same diameter. The distribution output member 21 is placed radially outward of the power distribution device PT so as to surround the power distribution device PT. The ring gear R and the output gear 22 are formed integrally with the distribution output member 21. At least one of the output gear 22 and the ring gear R is a helical gear. In the present embodiment, both the output gear 22 and the ring gear R are helical gears.

The ring gear R is formed near a central portion of the distribution output member 21 in the axial direction. The components of the power distribution device PT, such as the pinion gears P, the carrier CA, and the sun gear S, are placed radially inward of the ring gear R. That is, the entire power distribution device PT is placed radially inside the distribution output member 21, and the entire power distribution device PT is positioned so as to overlap the distribution output member 21 as viewed in the radial direction. The distribution output member 21 has two axial stepped portions 23, 24 near both axial ends of the inner peripheral surface 21*b*, respectively. The "axial step" in the inner peripheral surface refers to a portion that is formed at a predetermined axial position in the distribution output member 21 so that the inner diameter of the distribution output member 21 changes at the position. The distribution output member 21 is formed so that a portion located between the two stepped portions 23, 24 in the axial direction has a smaller inner diameter than the portions located axially outside the two stepped portions 23, 24. The ring gear R is formed on the smaller diameter portion of the inner peripheral surface 21*b* of the distribution output member 21. In the distribution output member 21, the portions located axially outward (on the axial first direction side and the axial second direction side) of the two stepped portions 23, 24 have a larger inner diameter than the portion located between the two stepped portions 23, 24 in the axial direction. The output support bearings 61, 62 are placed on the two larger diameter portions of the inner peripheral surface 21*b* of the distribution output member 21, respectively. The two output support bearings 61, 62 are placed so as to contact the axially outer sides (the axial first direction side and the axial second direction side) of stepped portions 23, 24.

The distribution output member 21 is supported so as to be rotatable with respect to the case 2 via the two output support bearings 61, 62. The two output support bearings 61, 62 are placed on both sides in the axial direction of the ring gear R and the power distribution device PT. The two output support bearings 61, 62 are placed between the inner peripheral surface 21*b* of the distribution output member 21 and the outer peripheral surfaces 6*a*, 8*a* of the output protruding portions 6, 8, respectively, and support the distribution output member 21 from radially inside so that the distribution output member 21 is rotatable with respect to the output protruding portions 6, 8. That is, the first output support bearing 61 is placed between a part of the inner peripheral surface 21*b* of the distribution output member 21, which is located on the axial first direction side with respect to the power distribution device PT, and the first output protruding portion 6 placed radially inward of this part of the inner peripheral surface 21*b*. The second output support bearing 62 is placed between a part of the inner peripheral surface 21*b* of the distribution output member 21, which is located on the axial second direction side with respect to the power distribution device PT, and the second output protruding portion 8 placed radially inside this part of the inner peripheral surface 21*b*. In the present embodiment, an end face on the axial first direction side of the first output support bearing 61 is located at the same axial position as an end face on the axial first direction side of the inner peripheral surface 21*b*, and an end face on the axial second direction side of the second output support bearing 62 is located at the same axial position as an end face on the axial second direction side of the inner peripheral surface 21*b*. Thus, the distribution output member 21 is supported from radially inside by the two output support bearings 61, 62 so as to be rotatable with respect to the first output protruding portion 6 of the first radially extending wall 4 and the second output protruding portion 8 of the second radially extending wall 7, which are placed so as to face each other in the accommodating space SP. The use of the configuration that supports the distribution output member 21 from radially inside can reduce the diameter of the two output support bearings 61, 62 as compared to the configuration that supports the distribution output member 21 from radially outside.

Bearings that are used as the two output support bearings 61, 62 are of the type that can receive a radial load and a thrust load. The "radial load" refers to a load in the radial direction, and the "thrust load" refers to a load in the axial direction. In the present embodiment, angular contact ball bearings are used as the two output support bearings 61, 62. The first output support bearing 61 is placed so that a radially outer portion of an end face on the axial second direction side of the first output support bearing 61 contacts the axial first direction side of the stepped portion 23 of the inner peripheral surface 21*b* of the distribution output member 21, and that a radially inner portion of the end face on the axial first direction side of the first output support bearing 61 contacts the axial second direction side of the first radially extending wall 4. Thus, the first output support bearing 61 is placed so as to be able to receive the thrust load in the axial first direction from the distribution output member 21.

On the other hand, the second output support bearing 62 is placed so that a radially outer portion of an end face on the axial first direction side of the second output support bearing 62 contacts the stepped portion 24 of the inner peripheral surface 21*b* of the distribution output member 21 from the axial second direction side, and that a radially inner portion of the end face on the axial second direction side of the second output support bearing 62 contacts the second radially extending wall 7 from the axial first direction side. Thus, the second output support bearing 62 is placed so as to be able to receive the thrust load in the axial second direction from the distribution output member 21. The thrust load that is applied to the distribution output member 21 is produced due to the output gear 22 and the ring gear R, at least one of which is a helical gear. In the case where a thrust load in the axial first direction is applied to the overall distribution output member 21, the first output support bearing 61 receives this thrust load. On the other hand, in the case where a thrust load in the axial second direction is applied to the distribution output member 21, the second output support bearing 62 receives this thrust load. That is, the output support bearing that receives the thrust load varies depending on the direction of the thrust load in the axial direction.

The tilt of the teeth of one or both of the output gear 22 and the ring gear R is set so that the thrust load toward the opposite side of the axial central position of the distribution output member 21 from the side on which the output gear 22 is placed is applied to the overall distribution output member 21. In the present embodiment, since the output gear 22 is placed on the axial first direction side with respect to the axial central position of the distribution output member 21, the tilts of the teeth of the output gear 22 and the ring gear R are set so that the thrust load in the axial second direction is applied to the overall distribution output member 21.

The output gear 22 is placed so as to overlap at least one of the two output support bearings 61, 62 and the power distribution device PT as viewed in the radial direction. In the present embodiment, the output gear 22 is placed so as to overlap the first output support bearing 61 as viewed in the radial direction. The output gear 22 is placed between the end face on the axial first direction side of the first output support bearing 61 and the end face on the axial second direction side of the second output support bearing 62 in the axial direction. In the present embodiment, an end face on the axial first direction side of the output gear 22 is placed close to the end faces on the axial first direction side of the first output support bearing 61 and the distribution output member 21.

The root diameter of the output gear 22 is larger than both the outer diameters of the two output support bearings 61, 62 and the root diameter of the ring gear R of the power distribution device PT. That is, the output gear 22 is placed radially outward of the two output support bearings 61, 62 and the power distribution device PT.

A fixing gear 82 is provided at a different axial position from the output gear 22 on the outer peripheral surface 21*a* of the distribution output member 21. The fixing gear 82 is a gear with which a fixing member 83 is engaged. The fixing member 83 holds the distribution output member 21 stationary with respect to the case 2. In the present embodiment, a fixing mechanism 81, which is formed by the fixing gear 82 and the fixing member 83, is a parking lock mechanism of the vehicle.

In the present embodiment, the fixing gear 82 is placed so as to overlap the second output support bearing 62 as viewed in the radial direction, and is placed close to the end faces on the axial second direction side of the distribution output member 21 and the second output support bearing 62.

Like the output gear 22, the root diameter of the fixing gear 82 is larger than both the outer diameters of the two output support bearings 61, 62 and the root diameter of the ring gear R of the power distribution device PT. That is, the fixing gear 82 is placed radially outward of the two output support bearings 61, 62 and the power distribution device PT.

In the present embodiment, as shown in FIG. 2, the fixing mechanism 81 has the fixing member 83 capable of swinging about a predetermined swing fulcrum 84, and a pawl 85 is integrally formed in the fixing member 83. The fixing member 83 and the pawl 85 swing in a predetermined movable range by a cam mechanism, not shown. When the pawl 85 meshes and engages with the fixing gear 82, the fixing mechanism 81 forcibly stops rotation of the distribution output member 21. On the other hand, when the pawl 85 does not mesh with the fixing gear 82 and is disengaged from the fixing gear 82, the fixing mechanism 81 allows the distribution output member 21 to rotate.

A second rotor shaft 36 is a shaft that applies the driving force of the second rotating electrical machine MG2 to the second rotating electrical machine output gear 37 formed integrally with a shaft member 38. As shown in FIG. 3, an inner peripheral surface of an end on the axial first direction side of the second rotor shaft 36 is spline coupled to an outer peripheral surface of an end on the axial second direction side of the shaft member 38. The second rotor shaft 36 and the shaft member 38, which rotate together, are supported by the case 2 so as to be rotatable via a plurality of bearings at a plurality of axial positions. Although not shown in the figures, a rotation sensor such as a resolver, which detects the rotational phase of the second rotor Ro2 of the second rotating electrical machine MG2, is provided so as to surround the second rotor shaft 36.

The first gear 42 and the second gear 43 of the counter gear mechanism C are formed integrally with the counter shaft 41. Thus, the counter shaft 41, the first gear 42, and the second gear 43 rotate together. In the present embodiment, the second gear 43 is placed on the axial second direction side with respect to the first gear 42. The counter shaft 41 is supported at a plurality of positions (in this example, two positions) in the axial direction so as to be rotatable with respect to the case 2. In this example, the counter shaft 41 is supported at its ends on the axial first direction side and on the axial second direction side so as to be rotatable with respect to the case 2 via a first counter bearing 65 and a second counter bearing 66. A first gear support member 44 that supports the first gear 42 is placed adjacent to the axial second direction side of the first counter bearing 65. A second gear support member 45 that supports the second gear 43 is placed adjacent to the axial first direction side of the second counter bearing 66. The number of teeth of the second gear 43 is made smaller than that of teeth of the first gear 42. The gear ratio (the ratio of the number of teeth) between the first gear 42 and the second gear 43 can be changed as appropriate according to vehicle characteristics etc.

As shown in FIGS. 2 and 3, the first gear 42 meshes with both the output gear 22 and the second rotating electrical machine output gear 37. In the present embodiment, the second rotating electrical machine MG2 basically outputs relatively large assist torque that drives the vehicle. Accordingly, the maximum value of the torque that can be transferred from the second rotating electrical machine output gear 37 to the first gear 42 is larger than that of the torque that can be transferred from the output gear 22 to the first gear 42. Thus, in the hybrid drive device 1 according to the present embodiment, the axial length of the second rotating electrical machine output gear 37 is made larger than that of the output gear 22 in order to allow larger torque to be transferred. In the present embodiment, the axial length of the first gear 42 is made equal to that of the second rotating electrical machine output gear 37 so that the output torque of the second rotating electrical machine MG2 can be effectively transferred to the first gear 42 without wasting the output torque, while reducing the overall axial dimension of the hybrid drive device 1. Thus, the axial length of the first gear 42 is larger than that of the output gear 22. Accordingly, the first gear 42 has a portion that does not mesh with the output gear 22 (in this example, the "non-meshing portion N" (see FIG. 4)).

The respective meshing positions of the first gear 42 and the output gear 22 are set so that the first gear 42 meshes with the output gear 22 with their respective ends on the axial second direction side being aligned with each other. In other words, the meshing positions of the first gear 42 and the output gear 22 are set so that the entire non-meshing portion N of the first gear 42 is located on the axial first direction side (the engine side) with respect to the output gear 22. In the present embodiment, the first counter bearing 65 is placed adjacent to the axial first direction side (the engine E) of the first gear 42, and the non-meshing portion N is positioned so as to overlap the first counter bearing 65 in the axial direction. As shown in FIG. 4, the first radially extending wall 4 is thin in the axial direction at a radial position corresponding to a meshing portion where the output gear 22 meshes with the first gear 42 (or the non-meshing portion N). The non-meshing portion N of the first gear 42 is placed in an empty space that is formed radially outward of the first output protruding portion 6 of the first radially extending wall 4 on the side of the counter gear mechanism C. This allows the empty space formed radially outward of the first output protruding portion 6 to be effectively used so that the counter gear mechanism C can be placed as much toward the axial first direction side (the engine E) as possible. Thus, the second rotating electrical machine MG2 and the output differential gear unit DF, which are directly drivingly coupled to the counter gear mechanism C, can be placed as much toward the axial first direction side (the engine E) as possible.

3. Arrangement and Configuration of Each Part of Hybrid Drive Device

The arrangement and configuration of each part of the hybrid drive device 1 according to the present embodiment will be described below. In particular, the arrangement and configuration of each component of the power transmission device 11 will be mainly described,

[Reduction in Axial Length of Distribution Output Member 21]

As described above, the two output support bearings 61, 62 and the ring gear R are provided on the inner peripheral surface 21b of the distribution output member 21. Thus, the output gear 22, which is provided on the outer peripheral surface 21a of the distribution output member 21, can be easily positioned to overlap the two output support bearings 61, 62 or the power distribution device PT as viewed in the radial direction. In the present embodiment, the output gear 22 is positioned to overlap the first output support bearing 61 as viewed in the radial direction. This can reduce the space in which the four elements, namely the output gear 22, the two output support bearings 61, 62, and the power distribution device PT, are arranged in the axial direction, as compared to the case where the output gear 22 does not overlap the two output support bearings 61, 62 and the power distribution device PT as viewed in the radial direction.

The two output support bearings 61, 62 are placed on both sides in the axial direction of the ring gear R and the power distribution device PT, and the end faces on both sides in the axial direction of the distribution output member 21 are formed so as to be aligned with the end face on the axial first direction side of the first output support bearing 61 and the end face on the axial second direction side of the second output support bearing 62, respectively. The output gear 22 is placed between the end face on the axial first direction side of the first output support bearing 61 and the end face on the axial second direction side of the second output support bearing 62 in the axial direction. This can minimize the axial length of the distribution output member 21 according to the axial lengths of the two output support bearings 61, 62 and the power distribution device PT which are placed on the inner peripheral surface 21b.

The two radially extending walls 4, 7 and the two output protruding portions 6, 8 are formed in the case 2 in order to place the two output support bearings 61, 62 on both sides in the axial direction on the inner peripheral surface 21b of the distribution output member 21. That is, the case 2 has the two radially extending walls 4, 7 and the two output protruding portions 6, 8. The two radially extending walls 4, 7 extend in the radial direction on both sides in the axial direction of the distribution output member 21, and are formed so that at least the radially inner ends of the two radially extending walls 4, 7 are located radially inward of the distribution output member 21. The two output protruding portions 6, 8 are located radially inward of the distribution output member 21 so as to protrude in the axial direction from the two radially extending walls 4, 8 toward the distribution output member 21, respectively.

The two output support bearings 61, 62 are placed between the inner peripheral surface 21b of the distribution output member 21 and the outer peripheral surfaces 6a, 8a of the output protruding portions 6, 8, respectively, and support the distribution output member 21 from radially inside so that the distribution output member 21 is rotatable with respect to the output protruding portions 6, 8.

The root diameter of the output gear 22 is larger than both the outer diameters of the two output support bearings 61, 62 and the root diameter of the ring gear R of the power distribution device PT. The output gear 22 is placed radially outward of the two output support bearings 61, 62 and the power distribution device PT. This allows the freedom in arrangement in the axial direction of the output gear 22 to be further increased. The distribution output member 21 can be formed in a cylindrical shape, and the strength thereof can be easily improved.

The fixing gear 82 is provided on the outer peripheral surface 21a of the distribution output member 21 on the axial second direction side, which is the opposite side from the axial first direction side on which the output gear 22 is provided. Thus, the fixing gear 82 can be provided by effectively using the outer peripheral surface 21a on the axial second direction side on which the output gear 22 is not placed. Accordingly, an increase in axial length of the distribution output member 21 can be suppressed even in the configuration including the fixing gear 28.

[Effective Use of Space Radially Inward of Distribution Output Member 21]

Arrangement of each member in a space that is located radially inward of the distribution output member 21 and that overlaps the distribution output member 21 as viewed in the radial direction (hereinafter this space will be referred to as the "radially inner space") will be described below.

The first rotor shaft 31 of the first rotating electrical machine MG1 and the input shaft I occupy a portion of the radially inner space which is located near the radial center of the radially inner space. The power distribution device PT is placed radially inward of the ring gear R provided near the axial center of the inner peripheral surface 21b of the distribution output member 21, and occupies a portion of the radially inner space which is located near the axial center of the radially inner space. The two output support bearings 61, 62 are placed on the inner peripheral surface 21b of the distribution output member 21 so as to be adjacent to both axial sides of the power distribution device PT, and occupy a radially outer part of the radially inner space on both axial sides of the power distribution device PT. The first output protruding portion 6 and the first input protruding portion 5 are positioned radially inward of the first output support bearing 61 so as to overlap the first output support bearing 61 as viewed in the radial direction. The first output protruding portion 6 and the first input protruding portion 5 occupy a radially inner part of the radially inner space on the axial first direction side of the power distribution device PT. The second output protruding portion 8 is positioned radially inward of the second output support bearing 62 so as to overlap the second output support bearing 62 as viewed in the radial direction. The second output protruding portion 8 occupies a radially inner part of the radially inner space on the axial second direction side of the power distribution device PT. Thus, there is no large empty space in the radially inner space, and the radially inner space is effectively used. In other words, the components of the power transmission device 11 are gathered and placed in the radially inner space. This can reduce the axial length of the power transmission device 11 and can reduce the overall size thereof.

[Space on the Side with Engine E]

Arrangement of each member in a space on the side where the engine E is provided with respect to the power distribution device PT will be described below.

The input shaft I is supported by the first input support bearing 69 supported by the first radially extending wall 4, and the distribution output member 21 is supported by the first output support bearing 61 supported by the first radially extending wall 4. Thus, both the input shaft I and the distribution output member 21 can be supported by the common first radially extending wall 4. The distribution output member 21 is supported from radially inside by the first output support bearing 61, and the input shaft I is supported from radially outside by the first input support bearing 69. Thus, the first output support bearing 61 and the first input support bearing 69 can be placed at different radial positions so as to overlap each other as viewed in the radial direction. This can reduce the axial dimension of the space in which the first output support bearing 61 and the first input support bearing 69 are placed. As described above, the first output support bearing 61 and the first input support bearing 69 are arranged by effectively using the space located radially inward of the distribution output member 21. This can make the axial interval between the power distribution device PT and the engine E closer to an interval required for one support bearing to be placed therein. This can reduce the axial length of the input shaft I that drivingly couples the engine E to the power distribution device PT. Thus, the diameter of the input shaft I can be more easily reduced or the axial length of the power transmission device 11 can be more easily reduced while ensuring required strength. This facilitates reduction in size and weight of the power transmission device 11.

Since the input shaft I and the distribution output member 21 are supported also on the side where the first rotating electrical machine MG1 is provided with respect to the power distribution device PT, only one support bearing for the input shaft I and only one support bearing for the distribution output member 21 are required on the side where the engine E is provided. This can reduce the axial interval between the power distribution device PT and the engine E.

[Space on the Side with First Rotating Electrical Machine MG1]

Arrangement of each member in a space located on the side where the first rotating electrical machine MG1 is provided with respect to the power distribution device PT will be described below.

The first rotor shaft 31 of the first rotating electrical machine MG1 is supported by the first rotating electrical machine bearing 63 supported by the second radially extending wall 7, and the power distribution member 21 is supported by the second output support bearing 62 supported by the second radially extending wall 7. Thus, both the first rotor shaft 31 and the distribution output member 21 can be supported by the common second radially extending wall 7. The distribution output member 21 is supported from radially inside by the second output support bearing 62, and the first rotor shaft 31 is supported from radially outside by the first rotating electrical machine bearing 63. Thus, the second output support bearing 62 and the first rotating electrical machine bearing 63 can be placed at different radial positions. As described above, the second output support bearing 62 is placed by effectively using the space located radially inward of the distribution output member 21. Thus, the axial interval between the power distribution device PT and the first rotating electrical machine MG1 can be reduced while efficiently placing the support bearings in this axial interval.

The second output support bearing 62 is placed on the axial first direction side with respect to the second radially extending wall 7, and the first rotating electrical machine bearing 63 is placed on the axial second direction side with respect to the second radially extending wall 7. That is, the second output support bearing 62 and the first rotating electrical machine bearing 63 are placed on both sides in the axial direction of the second radially extending wall 7. This allows a load for support to be applied to both sides in the axial direction of the second radially extending wall 7 in a balanced manner, and thus can suppress bending of the second radially extending wall 7 to one side in the axial direction. Moreover, the first rotating electrical machine bearing 63 and the second input protruding portion 12 can be placed by effectively using a space located radially inward of a coil end that protrudes toward the axial first direction side from the first rotating electrical machine MG1.

The input shaft I is supported on the side where the first rotating electrical machine MG1 is provided by using the inner peripheral surface of the first rotor shaft 31 of the first rotating electrical machine MG1. This eliminates the need to provide a support structure such as a support wall to merely support the input shaft I. Thus, the input shaft I can be supported while reducing the axial length of the power transmission device 11.

[Stabilization of Support]

Since the two output support bearings 61, 62 are placed on both sides in the axial direction of the ring gear R and the power distribution device PT. The axial distance between the two output support bearings 61, 62 can be secured. This makes it easier to stably support the distribution output member 21. For example, displacement of the central axis of rotation of the distribution output member 21 can be suppressed.

Since the input shaft I is also supported by the two input support bearings 69, 70 that are placed on both sides in the axial direction of the ring gear R and the power distribution device PT, the axial distance between the two input support bearings 69, 70 can be secured. This makes it easy to stably support the input shaft I.

The extending portion 15 of the input shaft I, which extends in the axial second direction from the distribution coupling portion 51, may be designed to have low strength because torque transfer between the engine E and the power distribution device PT is not required for the extending portion 15. Thus, the extending portion 15 has a smaller diameter than the region between the distribution coupling portion 51 and the engine coupling portion 13. This facilitates reduction in weight of the input shaft I, and also facilitates insertion of the extending portion 15 into the first rotor shaft 31 of the first rotating electrical machine MG1.

[Load Distribution]

The output gear 22 is placed between the end face on the axial first direction side of the first output support bearing 61 and the end face on the axial second direction side of the second output support bearing 62 in the axial direction. This allows the load that is applied to the output gear 22 to be appropriately distributed to and supported by the first output support bearing 61 and the second output support bearing 62.

Figure 5:
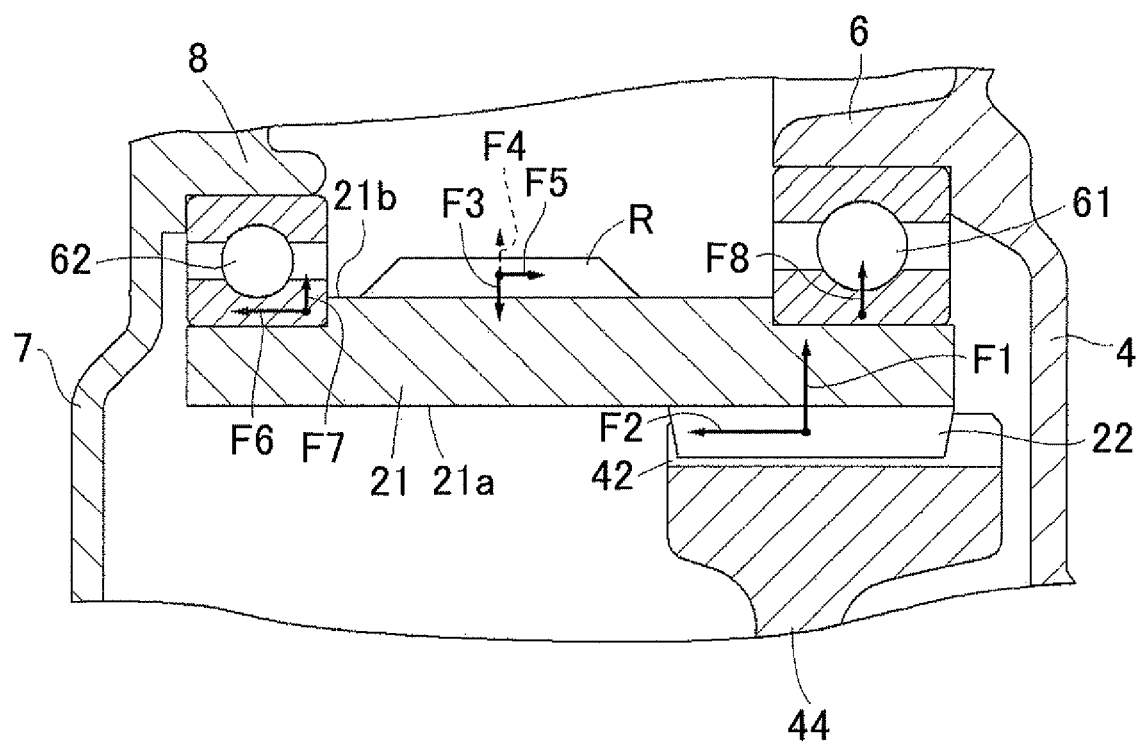
FIG. 5 is a view illustrating the hybrid drive device according to the embodiment of the present invention.

In the present embodiment, both the output gear 22 and the ring gear R are helical gears. As shown in FIG. 5, a thrust load F2 in the axial second direction and a radial load F1 in the radially inward direction are applied to the output gear 22 by torque transfer between the output gear 22 and the first gear 42 of the counter gear mechanism C. A thrust load F5 in the axial first direction and a radial load F3 in the radially outward direction are applied to the ring gear R by torque transfer between the ring gear R and the plurality of pinion gears P (in the present embodiment, four pinion gears P). Since the radial load F3 is applied to the ring gear R in the radially outward direction at each of the plurality of pinion gears P that are evenly arranged along the circumferential direction, the radial loads F3 cancel each other, and the two output support bearings 61, 62 are not subjected to a large radial load. A radial load F4 that cancels the radial load F3 is shown by a broken arrow in FIG. 5. The thrust load F5 is the total thrust load in the axial first direction which is applied to the ring gear R at each of the plurality of pinion gears P. In FIG. 5, such total thrust load is shown as the thrust load F5.

A thrust load F6 that is applied to the distribution output member 21 due to the helical gears is the sum of the thrust load F2 in the axial second direction and the thrust load F5 in the axial first direction. The tilt of each helical gear is set so that the direction of the thrust load F2 to the output gear 22 becomes opposite to the direction of the thrust load F5 to the ring gear R. This reduces the magnitude of the thrust load that is applied to the distribution output member 21.

In the present embodiment, the output gear 22 is placed on the axial first direction side with respect to the axial central position of the distribution output member 21. Thus, the tilts of the teeth of the output gear 22 and the ring gear R are set so that the direction of the thrust load that is applied to the distribution output member 21 is the axial second direction opposite to the axial first direction. In other words, the output gear 22 is placed on a side of the axial central position of the distribution output member 21 in a direction opposite the direction of the thrust load that is applied to the distribution output member 21 due to the helical gears. In the present embodiment, the magnitude of the thrust load F5 to the ring gear R is smaller than that of the thrust load F2 to the output gear 22, and the direction of the thrust load that is applied to the distribution output member 21 is the axial second direction. Since the thrust load F6 is applied to the distribution output member 21 in the axial second direction, the second output support bearing 62 located on the axial second direction side is subjected to the thrust load F6.

On the other hand, the radial load F1 to the output gear 22 is distributed according to the distance between the output gear 22 and each output support bearing 61, 62 and is applied to each output support bearing 61, 62. In the present embodiment, since the output gear 22 is placed on the axial first direction side, a radial load F8 that is distributed to the first output support bearing 61 is larger than a radial load F7 that is distributed to the second output support bearing 62.

The radial load F8 that is applied to the first output support bearing 61 is larger than the radial load that is applied to the second output support bearing 62, and the thrust load F6 that is applied to the second output support bearing 62 is larger than the thrust load that is applied to the first output support bearing 61. Thus, support of both the thrust load and the radial load can be appropriately assigned between the two output support bearings 61, 62. Accordingly, an appropriate bearing can be used as the output support bearing 61, 62 according to the type and magnitude of the load to be supported by that output support bearing 61, 62, whereby the strength of the output support bearing 61, 62 can be improved or the size of the output support bearing 61, 62 can be reduced. Moreover, the load of the same magnitude can be applied to the two output support bearings 61, 62, and the two output support bearings 61, 62 can be reduced in size in a balanced manner.

Other Embodiments

Other embodiments of the vehicle drive device of the present invention will be described below. The configuration of each embodiment described below need not necessarily be used solely, and may be combined as appropriate with the configurations of the other embodiments as long as no inconsistency arises.

(1) The above embodiment is described with respect to an example in which the power distribution device PT is formed by a single-pinion type planetary gear unit. However, embodiments of the present invention are not limited to this. The power distribution device PT may be formed by various planetary gear units such as double-pinion type and Ravigneaux type planetary gear units.

(2) The above embodiment is described with respect to an example in which the distribution output member 21 is drivingly coupled to the wheels W via the counter gear mechanism C and the output differential gear unit DF. However, embodiments of the present invention are not limited to this. The distribution output member 21 may be drivingly coupled to the wheels W without having one or both of the counter gear mechanism C and the output differential gear unit DF interposed therebetween, or via another device such as a speed change mechanism.

(3) The above embodiment is described with respect to an example in which the output gear 22, the ring gear R, and the fixing gear 82 are formed integrally with the distribution output member 21. However, embodiments of the present invention are not limited to this. At least one of the output gear 22, the ring gear R, and the fixing gear 82 may be formed as a separate element from the distribution output member 21, and may be coupled to the distribution output member 21. Alternatively, the distribution output member 21 may be formed by a plurality of members.

(4) The above embodiment is described with respect to an example in which the output gear 22 is placed so as to overlap the first output support bearing 61 as viewed in the radial direction. However, embodiments of the present invention are not limited to this. The output gear 22 need only be placed so as to overlap at least one of the power distribution device PT and the two output support bearings 61, 62 as viewed in the radial direction. For example, the output gear 22 may be placed on the axial second direction side so as to overlap the second output support bearing 62 as viewed in the radial direction. In this case, the fixing gear 82 may be placed on the axial first direction side on the opposite side from the output gear 22.

(5) The above embodiment is described with respect to an example in which the root diameter of the output gear 22 is larger than both the outer diameters of the two output support bearings 61, 62 and the root diameter of the ring gear R of the power distribution device PT. However, embodiments of the present invention are not limited to this. The root diameter of the output gear 22 may be smaller than the outer diameter or the root diameter of any of the power distribution device PT and the two output support bearings 61, 62, which does not overlap the output gear 22 as viewed in the radial direction.

(6) The above embodiment is described with respect to an example in which the output gear 22 is placed between the end face on the axial first direction side of the first output support bearing 61 and the end face on the axial second direction side of the second output support bearing 62 in the axial direction. However, embodiments of the present invention are not limited to this. A part of the output gear 22 may be placed on the axial first direction side with respect to the end face on the axial first direction side of the first output support bearing 61, or may be placed on the axial second direction side with respect to the end face on the axial second direction side of the second output support bearing 62.

(7) The above embodiment is described with respect to an example in which the output gear 22 is placed on the opposite side of the axial central position of the distribution output member 21 from the side of the direction of the thrust load that is applied to the distribution output member 21 due to the helical gears. However, embodiments of the present invention are not limited to this. The output gear 22 may be placed on the same side of the axial central position of the distribution output member 21 as the side of the direction of the thrust load that is applied to the distribution output member 21 due to the helical gears. Alternatively, the output gear 22 may be placed at the axial central position of the distribution output member 21.

One or both of the output gear 22 and the ring gear R may be a gear other than the helical gear, such as a spur gear or a double helical gear. The direction of the thrust load that is applied to the output gear 22 may be the same as that of the thrust load that is applied to the ring gear R.

(8) The above embodiment is described with respect to an example in which the input shaft I includes the extending portion 15 extending in the axial second direction from the distribution coupling portion 51, and the extending portion 15 is supported by the inner peripheral surface of the first rotor shaft 31 of the first rotating electrical machine MG1. However, embodiments of the present invention are not limited to this. The input shaft I may not include the extending portion 15. Alternatively, the input shaft I may include the extending portion 15 and may be configured so that the extending portion 15 is not inserted on the inner peripheral surface of the first rotor shaft 31 of the first rotating electrical machine MG1, or so that the extending portion 15 is inserted on the inner peripheral surface of the first rotor shaft 31 of the first rotating electrical machine MG1, but is not supported by the inner peripheral surface of the first rotor shaft 31 of the first rotating electrical machine MG1.

(9) The above embodiment is described with respect to an example in which the first rotor shaft 31 of the first rotating electrical machine MG1 is coupled to the sun gear S as a rotating element, and the input shaft I is coupled to the carrier CA as a rotating element. However, embodiments of the present invention are not limited to this. The first rotor shaft 31 of the first rotating electrical machine MG1 and the input shaft I need only be coupled to any of the rotating elements of the planetary gear unit. For example, the first rotor shaft 31 of the first rotating electrical machine MG1 may be coupled to the carrier CA as the rotating element, and the input shaft I may be coupled to the sun gear S as the rotating element.

(10) The above embodiment is described with respect to an example in which the first rotating electrical machine bearing 63 is placed on the axial second direction side with respect to the second output support bearing 62. However, embodiments of the present invention are not limited to this. The first rotating electrical machine bearing 63 may be placed adjacent to the axial second direction side of the power distribution device PT so as to overlap the second output support bearing 62 as viewed in the radial direction.

(11) The above embodiment is described with respect to an example in which the first output protruding portion 6 and the first input protruding portion 5 are formed as separate protruding portions that are separated from each other in the radial direction. However, embodiments of the present invention are not limited to this. The first output protruding portion 6 and the first input protruding portion 5 may be integrally formed as a single protruding portion.

(12) The above embodiment is described with respect to an example in which the power transmission device 11 forms a part of the hybrid drive device 1. However, embodiments of the present invention are not limited to this. The power transmission device 11 may form a part of a drive device that does not include one or both of the first rotating electrical machine MG1 and the second rotating electrical machine MG2. If the drive device does not include the first rotating electrical machine MG1, the power distribution device PT may be drivingly coupled to an electric generator, a power unit such as a compressor of an air conditioner, or the case 2, instead of being drivingly coupled to the first rotating electrical machine MG1.

The present invention can be preferably used in power transmission devices including an input member, an output member, and a planetary gear unit provided in a power transmission path connecting the input member to the output member, a case accommodating the output member and the planetary gear unit, and two output support bearings supporting the output member so that the output member is rotatable with respect to the case.

What is claimed is:
1. A power transmission device, comprising:
an input member; an output member; a planetary gear unit provided in a power transmission path connecting the input member to the output member; a case accommodating the output member and the planetary gear unit; and two output support bearings supporting the output member so that the output member is rotatable with respect to the case, wherein an output gear is provided on an outer peripheral surface of the output member, and a ring gear of the planetary gear unit is provided on an inner peripheral surface of the output member, and the two output support bearings are placed on both sides in an axial direction of the ring gear, are placed between the inner peripheral surface of the output member and the case, and supports the output member from radially inside so that the output member is rotatable with respect to the case.

2. The power transmission device according to claim 1, wherein
the output gear is placed as to overlap at least one of the planetary gear unit and the two output support bearings as viewed in a radial direction.

3. The power transmission device according to claim 1, wherein
a root diameter of the output gear is larger than both outer diameters of the two output support bearings and a root diameter of the ring gear.

4. The power transmission device according to claim 1, wherein
the two output support bearings are a first output support bearing placed on an axial first direction side, which is one side in the axial direction of the planetary gear unit, and a second output support bearing placed on an axial second direction side, which is the other side in the axial direction of the planetary gear unit, and
the output gear is placed between an end face on the axial first direction side of the first output support bearing and an end face on the axial second direction side of the second output support bearing in the axial direction.

5. The power transmission device according to claim 1, wherein
at least one of the output gear and the ring gear is a helical gear, and
the output gear is placed on a side of an axial central position of the output member in a direction opposite a direction of an axial load that is applied to the output member due to the helical gear.

6. The power transmission device according to claim 1, wherein
the case has two radially extending portions and two output protruding portions, the two radially extending portions extend in the radial direction on both sides in the axial direction of the output member, and are formed so that at least radially inner ends of the two radially extending portions are located radially inward of the output member, the two output protruding portions are located radially inward of the output member so as to protrude in the axial direction from the two radially extending portions toward the output member, respectively, and the two output support bearings are placed between the inner peripheral surface of the output member and outer peripheral surfaces of the output protruding portions, respectively, and support the output member from radially inside so that the output member is rotatable with respect to the output protruding portions.

7. The power transmission device according to claim 1, further comprising:
a rotating electrical machine placed coaxially with the planetary gear unit; and
a rotating electrical machine bearing that supports a rotating shaft of the rotating electrical machine so that the rotating shaft is rotatable with respect to the case, wherein
the case has a radially extending portion that supports the output support bearing placed on a side where the rotating electrical machine is provided with respect to the ring gear in the axial direction,
the planetary gear unit includes, in addition to the ring gear, a rotating element that is drivingly coupled to the input member not through the other rotating elements of the planetary gear unit, and a rotating element that is drivingly coupled to the rotating electrical machine not through the other rotating elements of the planetary gear unit,
the rotating electrical machine bearing is supported by a radially inner end of the radially extending portion placed on the side where the rotating electrical machine is provided, and supports the rotating shaft of the rotating electrical machine from radially outside so that the rotating shaft of the rotating electrical machine is rotatable with respect to the radially extending portion.

8. The power transmission device according to claim 1, further comprising:
a fixing gear with which a fixing member is engaged, wherein
the fixing member holds the output member stationary with respect to the case, and the fixing gear is provided at a different axial position from the outer gear on the outer peripheral surface of the output member.

9. The power transmission device according to claim 2, wherein
a root diameter of the output gear is larger than both outer diameters of the two output support bearings and a root diameter of the ring gear.

10. The power transmission device according to claim 9, wherein
the two output support bearings are a first output support bearing placed on an axial first direction side, which is one side in the axial direction of the planetary gear unit, and a second output support bearing placed on an axial second direction side, which is the other side in the axial direction of the planetary gear unit, and
the output gear is placed between an end face on the axial first direction side of the first output support bearing and an end face on the axial second direction side of the second output support bearing in the axial direction.

11. The power transmission device according to claim 10, wherein
at least one of the output gear and the ring gear is a helical gear, and
the output gear is placed on a side of an axial central position of the output member in a direction opposite a direction of an axial load that is applied to the output member due to the helical gear.

12. The power transmission device according to claim 11, wherein
the case has two radially extending portions and two output protruding portions, the two radially extending portions extend in the radial direction on both sides in the axial direction of the output member, and are formed so that at least radially inner ends of the two radially extending portions are located radially inward of the output member, the two output protruding portions are located radially inward of the output member so as to protrude in the axial direction from the two radially extending portions toward the output member, respectively, and the two output support bearings are placed between the inner peripheral surface of the output member and outer peripheral surfaces of the output protruding portions, respectively, and support the output member from radially inside so that the output member is rotatable with respect to the output protruding portions.

13. The power transmission device according to claim 12, further comprising:

a rotating electrical machine placed coaxially with the planetary gear unit; and a rotating electrical machine bearing that supports a rotating shaft of the rotating electrical machine so that the rotating shaft is rotatable with respect to the case, wherein the case has a radially extending portion that supports the output support bearing placed on a side where the rotating electrical machine is provided with respect to the ring gear in the axial direction, the planetary gear unit includes, in addition to the ring gear, a rotating element that is drivingly coupled to the input member not through the other rotating elements of the planetary gear unit, and a rotating element that is drivingly coupled to the rotating electrical machine not through the other rotating elements of the planetary gear unit, the rotating electrical machine bearing is supported by a radially inner end of the radially extending portion placed on the side where the rotating electrical machine is provided, and supports the rotating shaft of the rotating electrical machine from radially outside so that the rotating shaft of the rotating electrical machine is rotatable with respect to the radially extending portion.

14. The power transmission device according to claim 13, further comprising:

a fixing gear with which a fixing member is engaged, wherein the fixing member holds the output member stationary with respect to the case, and the fixing gear is provided at a different axial position from the outer gear on the outer peripheral surface of the output member.

15. The power transmission device according to claim 2, wherein the two output support bearings are a first output support bearing placed on an axial first direction side, which is one side in the axial direction of the planetary gear unit, and a second output support bearing placed on an axial second direction side, which is the other side in the axial direction of the planetary gear unit, and the output gear is placed between an end face on the axial first direction side of the first output support bearing and an end face on the axial second direction side of the second output support bearing in the axial direction.

16. The power transmission device according to claim 3, wherein the two output support bearings are a first output support bearing placed on an axial first direction side, which is one side in the axial direction of the planetary gear unit, and a second output support bearing placed on an axial second direction side, which is the other side in the axial direction of the planetary gear unit, and the output gear is placed between an end face on the axial first direction side of the first output support bearing and an end face on the axial second direction side of the second output support bearing in the axial direction.

17. The power transmission device according to claim 2, wherein at least one of the output gear and the ring gear is a helical gear, and the output gear is placed on a side of an axial central position of the output member in a direction opposite a direction of an axial load that is applied to the output member due to the helical gear.

18. The power transmission device according to claim 2, wherein the case has two radially extending portions and two output protruding portions, the two radially extending portions extend in the radial direction on both sides in the axial direction of the output member, and are formed so that at least radially inner ends of the two radially extending portions are located radially inward of the output member, the two output protruding portions are located radially inward of the output member so as to protrude in the axial direction from the two radially extending portions toward the output member, respectively, and the two output support bearings are placed between the inner peripheral surface of the output member and outer peripheral surfaces of the output protruding portions, respectively, and support the output member from radially inside so that the output member is rotatable with respect to the output protruding portions.

19. The power transmission device according to claim 3, wherein at least one of the output gear and the ring gear is a helical gear, and the output gear is placed on a side of an axial central position of the output member in a direction opposite a direction of an axial load that is applied to the output member due to the helical gear.

20. The power transmission device according to claim 3, wherein the case has two radially extending portions and two output protruding portions, the two radially extending portions extend in the radial direction on both sides in the axial direction of the output member, and are formed so that at least radially inner ends of the two radially extending portions are located radially inward of the output member, the two output protruding portions are located radially inward of the output member so as to protrude in the axial direction from the two radially extending portions toward the output member, respectively, and the two output support bearings are placed between the inner peripheral surface of the output member and outer peripheral surfaces of the output protruding portions, respectively, and support the output member from radially inside so that the output member is rotatable with respect to the output protruding portions.

* * * * *